United States Patent

[11] 3,585,372

| [72] | Inventors | Raymond C. Bell<br>Playa Del Rey;<br>Josef K. Holy, Torrance; John W. Tarbox, Malibu; Esteban J. Toscano, Tarzana, all of, Calif. |
|---|---|---|
| [21] | Appl. No. | 868,963 |
| [22] | Filed | Oct. 1, 1969 |
| [45] | Patented | June 15, 1971 |
| [73] | Assignee | Hughes Aircraft Company<br>Culver City, Calif.<br>Continuation of application Ser. No. 597,624, Nov. 29, 1966, now abandoned. |

[54] ELECTRICAL CONTROL SYSTEM
14 Claims, 12 Drawing Figs.

[52] U.S. Cl. ................................................ 235/92,
318/28, 235/151.11
[51] Int. Cl. .......................................................... G05b 11/00
[50] Field of Search ........................................... 235/151.11,
151.1, 151, 92; 340/172.5; 318/20, 320

[56] References Cited
UNITED STATES PATENTS

| 2,817,775 | 12/1957 | Rosenberg et al. | 235/151.11 |
| 3,183,421 | 5/1965 | Herchenroeder | 318/28 |
| 3,246,125 | 4/1966 | Mergler | 235/151.11 (X) |
| 3,248,622 | 4/1966 | Kelling | 318/28 |
| 3,325,633 | 6/1967 | Lukens | 235/151.11 |
| 3,308,279 | 3/1967 | Kelling | 235/151.11 |
| 3,348,208 | 10/1967 | Rosener | 340/172.5 |
| 3,353,161 | 11/1967 | Toscano | 340/172.5 |
| 3,482,155 | 12/1969 | Fredriksen | 318/28 |

Primary Examiner—Eugene G. Botz
Attorneys—James K. Haskell and E. F. Oberheim

ABSTRACT: A numerical positioning system having a desired position register and an overshoot register in which indications of increments of movement of the element being positioned, beyond the desired position, are stored as a position count in the overshoot register and the magnitude of the count of the overshoot register is transferred to the position register and algebraically combined with a succeeding indication of desired position to indicate the succeeding extent of movement required to reach the succeeding desired position. Flexibility is obtained by utilizing desired position and overshoot registers which are bidirectional and reversible and which when counted down to zero and beyond will change sign and start counting up.

ELECTRICAL CONTROL SYSTEM

This is a continuation application of application Ser. No. 597,624, now abandoned, which was assigned to the assignee of the present application.

This invention relates to electrical control systems and more particularly to a novel and improved electrical system for controlling the position of a moving element of the like.

Electronic control systems for controlling the position of a moveable element are well known. Such an element may be, for example, a work table, platen, spindle, or the like, for milling machines, or the like, which is movable in one or more axes, the zero position of each axis being a mechanical limit in the axis or an arbitrary or selected point between the extremes of movement, sometimes called the crossover point. Each axis is divided into a plurality of scale divisions called increments. Hence, an incremental transducer system including a counter is employed with counts electrical count pulses resulting from increments of movement in each direction. The way in which the count pulses representative of increments of movement are handled by the system depends upon the sign of the input signals applied thereto which represent the direction of movement according to this invention, a counter responsive to the sign signals is employed for counting count pulses representative of incremental movements and is of the type which always counts up from a count of zero. Thus, a count up from zero when movement is in the positive direction and the register has a positive sign indicates increasing value, while a count up from zero when movement is in the negative direction from an arbitrary or selected zero point when the register has a negative sign indicates decreasing value. These counts of increments of movement are stored in the counter until the axis drive is initiated. Such a counter and its usefulness in this connection is explained in a copending patent application entitled "Reversible Electronic Digital Counter," invented by Esteban J. Toscano, Ser. No. 560,294, filed June 24, 1966, and assigned to the assignee of the present invention.

In one type of numerical machine tool control system data concerning the desired position of a work table, for example, is loaded into a position register from a program storage system, such as a perforated paper tape, or the like, to indicate to the control system the total number of increments of movement of the work table desired in one of its several axes of movement. The data in the position register then enables the system to move and position the work table. Because of the mass of the part being moved the momentum of the part, in this case the work table, may result in overshooting of the desired position. This position error is recorded and stored in an overshoot register. The magnitude of the overshoot count is used to reposition the work table or tool for operation.

In earlier systems of electrical control for controlling the position of a moving element, the count pulses originating from the axis in which movement of the moving element took place were first used to count an overshoot register to its full capacity and only after the overshoot register was full could it then be possible to count into a position register. In the system of the present invention, the contents of the overshoot register are algebraically added to the contents of the position register at the beginning of movement of the movable element in the axis so that the overshoot register is empty rather than full before positioning movement of the movable element is completed.

In the above prior art the overshoot register will contain an unknown number of counts; thus, to account for this unknown number it was necessary to fill up the overshoot register prior to counting into the position register which then resulted in a known number of pulses being stored therein. Since some of the pulses generated by movement of the movable element are stored in the overshoot register, the position register does not contain the true distance which the movable element must travel. This may introduce difficulties if a velocity reference is used which is proportional to the desired distance to travel. This is accommodated by controlling the position register so that it does not count to zero when the desired position is reached but rather to a number which includes the capacity of the overshoot register. In such an arrangement the minimum distance that may be programmed equals the count capacity of the overshoot register plus one count.

The present invention provides improvements in an arrangement in which the aforesaid number of unknown pulses in the overshoot register is made known to the electrical control system by counting these pulses out of the overshoot register, or otherwise transferring the overshoot count, into the position register so that the count in the overshoot register is reduced to zero. Such counting is not performed by the application of the transducer originated pulses (hereafter referred to as count pulses) which are the result of a true physical motion but rather such counting takes place by the application of artificially generated clock pulses (hereafter referred to as CLK pulses) which do not represent a physical movement of the controlled element. In the operation of transferring of the overshoot count no axis pulse counting is taking place but merely a manipulation of the contents of the overshoot register and the position register which will result in the aforesaid algebraic summation of the count of desired movement of the controlled element with the count of overshoot movement from the overshoot register. As the overshoot register is counted to zero for all practical purposes before movement ceases, the overshoot register is entirely out of the control loop of the system until such movement is completed. Therefore, the position register always contains the true distance to go. Also, the position register reaches a count of zero at the end of the movement.

The present invention provides a system for algebraically summing the contents or count of the position register and the overshoot register in the position register to automatically account for the overshoot error during the initial positioning of the moving element.

Briefly described, the present invention includes a first means including a position register which stores a count indicative of a desired position of a machine element in one axis of the aforesaid machine tool. After the count of desired position is placed in the position register a move command is generated and used to initate operation of to a feed axis drive which causes the machine element to be moved in said one axis in the command direction. An incremental transducer system responsive to this movement produces count pulses which count down the position register. When the position register is counted down to zero power is removed from the feed axis drive. At this time should the machine element coast past the exact zero position, an overshoot occurs. By this invention the count of the number of increments of overshoot movement is stored in a means including an overshoot register. By circuitry, not herein described, the count in the overshoot register is used to control repositioning of the machine element to its correct position in the axis. But should a command from the information input equipment result in a new count of desired position being stored in the position register before the feed axis drive responding to the overshoot register has corrected the error, the count of the overshoot register is algebraically summed with the new count of desired position being placed in the position register as the new move is started. Thus, the error in position of the machine element is accounted for in the position register in the corrected count of the new desired position.

It therefore becomes one object of this invention to provide a novel and improved electrical control system for minimizing the effects of overshoot operations of, for example, machine tool positioning apparatus.

Another object of this invention is to provide a novel and improved electrical control system which utilizes electronic logic circuitry for algebraically summing the contents of a position register and the contents of an overshoot register.

Another object of this invention is to provide a novel and improved electrical control system which utilizes a clock pulse source for counting the position register in a specific direction with respect to the count of the overshoot register.

Another object of this invention is to provide a novel and improved electrical control system which causes the magnitude of the count of the overshoot register to be transferred to the position register, either in a positive or negative mode depending upon the sign of the input data.

Another object of this invention is to provide a novel and improved electrical control system which uses a reversible countup-countdown counter for both its position register and its overshoot register.

Another object of this invention is to provide a novel and improved electrical control system which includes a means for providing a pulse to cause transfer of the contents from the overshoot register to the position register to halt operation when a date input is being accepted by the control system.

The above objects, features and advantages will be understood by reference to the following specification when considered in conjunction with the accompanying drawings wherein corresponding parts have similar reference characters throughout the differing figures and wherein.

Conventional logic symbols are employed in illustrating a presently preferred embodiment of this invention which will hereafter be described. The conventional logic elements comprise AND gates, OR gates, inverter circuits and flip-flops. Monostable multivibrators hereafter referred to as one-shot circuits are used as pulse shaping circuits or as delay elements in the preferred embodiment.

The present invention employs JK flip-flops as bistable switches although other bistable switches are usable. As is well known to those skilled in the art the JK flip-flop is capable of changing electrical states (from true to false or vice versa) on its output terminals if switching pulses are applied to both of its J and K inputs simultaneously. If a switching pulse is applied to the J terminal of a flip-flop previously set false the flip-flop will change to a true state but if the flip-flop is true and the J input is enabled or pulsed the flip-flop will not change. On the other hand, should the flip-flop be true and its K input is enabled or pulsed the flip-flop will change to false. If the flip-flop is already in a false state and the K input is enabled or pulsed the flip-flop will not change electrical state.

Figure 1:
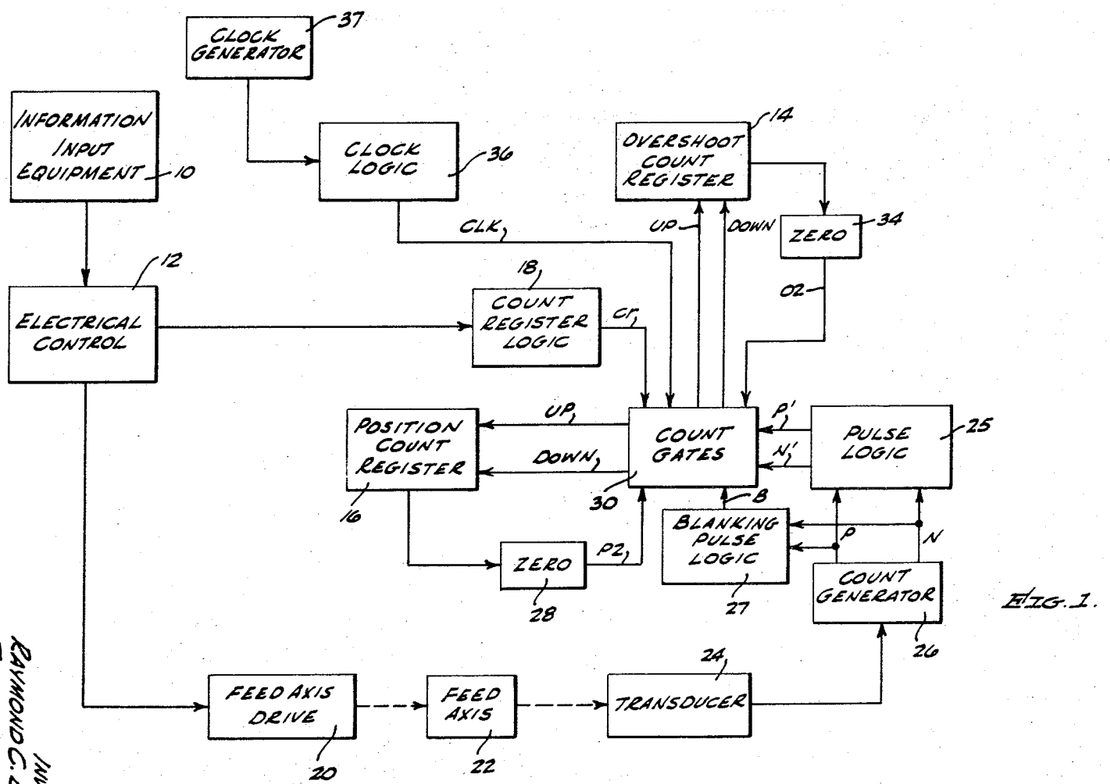
FIG. 1 is a simplified block diagram illustrating the organization of the components comprising one preferred embodiment of this invention.
Figure 2:
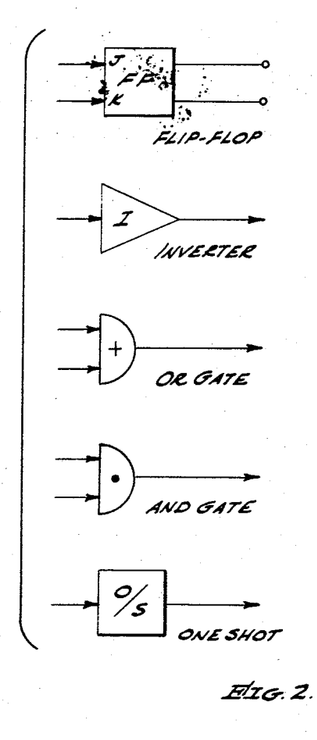
FIG. 2 illustrates the drawing symbols and descriptive legends for selected logical elements used in the drawings and in the description of this invention.

Turning now to a more detailed description of this invention and referring to FIG. 1, the arrangement illustrated therein is primarily directed to the control of a machine tool and the electrical control system used therewith. The details of such a system are illustrated and described in U.S. Pat. No. 3,209,222 for a "Discrete Signal Electrical Positioning Control System," issued to J. K. Holy on Sept. 28, 1965, and assigned to the assignee of this invention. Further particular details of an arrangement of this type may be had by reference to U.S. Pat. No. 3,252,147 for an "Electrical System of Control," issued to E. J. Toscano on May 17, 1966, and also assigned to the assignee of this invention.

With reference to FIG. 1, the information input equipment 10 may include any suitable type of discrete signal program. For the purpose of this specification it will be assumed to include a suitable tape reader system having a perforated tape which may be read by suitable types of phototransducers, such as self-generating devices. These photoelectrical devices occupy one impedance of voltage state when dark and a second impedance or voltage state when illuminated with light. The details of such a phototransducer system may be found by reference to U.S. Pat. No. 2,848,698 issued to T. T. Kumagai, et al., on Aug. 19, 1958, and assigned to the assignee of this invention.

The output of such information input equipment 10, in the form of serially presented signal groups, is distributed by suitable electrical controls 12 to position count register 16 by a position count register logic circuit 18. The position count register 16 may be a reversible up/down counter, as previously mentioned, which comprises a digital counter which has a plurality of flip-flops coupled for successive enabling by the state of the preceding flip-flop and further input enabling signals. Input means capable of providing the said further input signals, for example, may include a storage means for storing the sign of the counters whether the counter will count in an up or down mode; gating means for controlling the sign of the storage means; and further gating means for proper channeling of increase count signals or decrease count signals into the count up or countdown inputs of the counter.

When the information input equipment has loaded the desired data into position count register 16 via circuits identified SET and it has reached its count as determined thereby, a feed axis drive 20 is enabled by the electrical control 12. The feed axis drive is enabled by the production of move signals M$n$ or M$p$. These signals are produced whenever the bilevel control signal PZ switches from that level indicating the position counter is at zero count to a different level indicating the position counter is not at a zero count. The movement of feed axis 22 and the machine element coupled therewith is detected by a transducer 24. The output of the transducer 24 is coupled into a count generator 26 which produces the axis pulses P or N. Pulse logic circuits receiving the pulses P or N and count gates 30 couple count pulses P' or N' over the connections marked UP or DOWN to cause counting of the position count register 16 counting toward its zero count condition. Upon reaching the zero count condition zero indicating logic circuit 28 is enabled and the signal PZ returns to its zero count indicating level to disable that portion of the electrical control 12 producing the move signals M$n$ or M$p$ so that operation of the feed axis drive 20 ceases. The zero indicating logic 34 circuit is also coupled to enable count gates 30 which in turn will enable the overshoot count register 14, as will be seen, to accept the first P' or N' pulse resulting from movement of the feed axis 22 when overshoot occurs. Upon starting the next position move and providing the count of the overshoot register 14 is not at zero as indicated by zero indicating logic circuit 34, a clock pulse logic circuit 36, which is coupled to a clock pulse generator 37, couples clock pulses CLK to the count gates 30. The output of the count gates 30 now count down the overshoot count register 14 while counting the position count register 16 up or down to effectively transfer the count of the overshoot count register to the position count register 16. The transfer occurs one count at a time with each clock pulse. The overshoot register is always counted down by the clock pulses and the position register will be counted up or down depending upon the relationship of the signs of the position and overshoot registers.

Figures 3, 11:
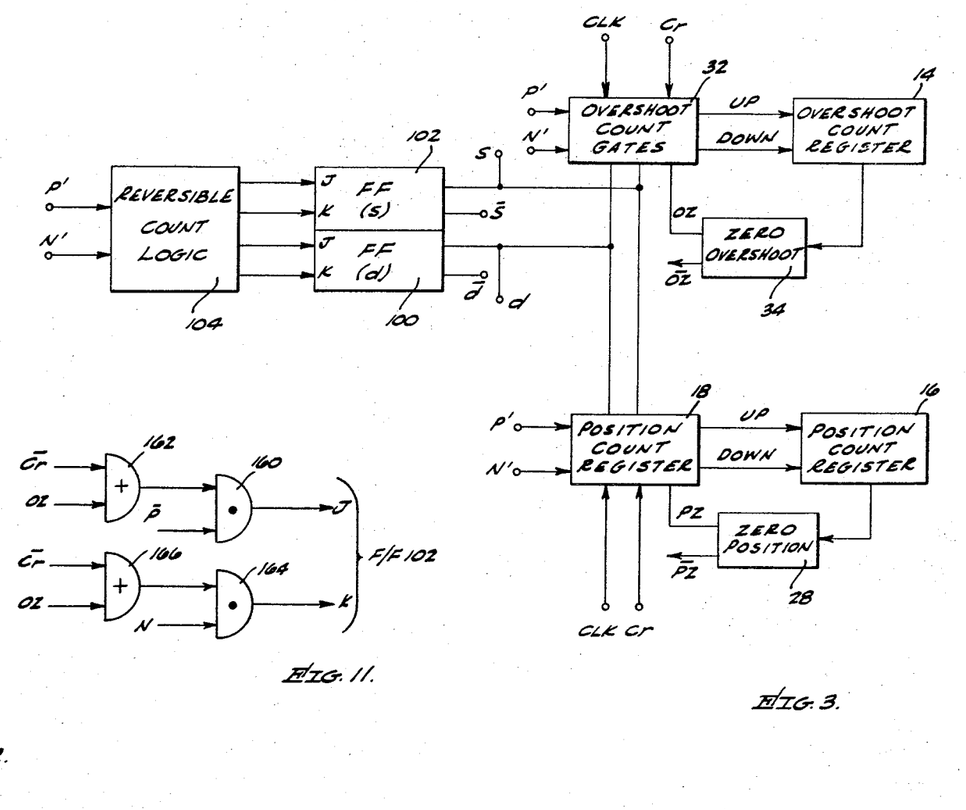
FIG. 3 is a block diagram of an electrical control arrangement for causing the registers employed herein to count in selected directions.
FIG. 11 is a block diagram of a gate circuit for producing sign pulses for controlling a sign control flip-flop.
Figure 5:
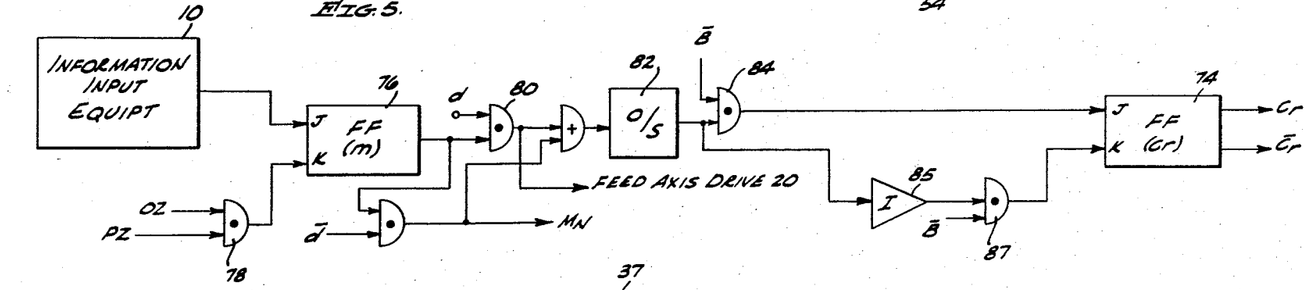
FIG. 5 is a block diagram of that portion of the system which produces count register signals.

As seen in FIG. 3, the position count gate 18$a$, forming part of count gates 30 of FIG. 1, which enables position count register 16 to count up or down has for enabling inputs, as shown in FIG. 3, a pulse P' and a pulse N', one or the other of which is generated by the pulse logic circuit 25, a signal S from a sign flip-flop 102 which indicates the sign of the overshoot count register 14, a signal d from a directional flip-flop 100 which indicates the sign of the position count register 16, a clock pulse signal (CLK) and a count register signal Cr which is an output signal from a count register flip-flop 74 of FIG. 5 (yet to be described) and which is ordinarily on when the feed axis drive 20 is enabled. The logical details of the position count gate 18a will be explained later.

Both the overshoot count register 14 and the position count register 16 used in this control system are bidirectional and reversible counters as previously mentioned. The count of the overshoot register 14 is serially algebraically combined with the count of the position count register 16 by means of pulses generated by the clock pulse generator circuits 36 and 37. The clock pulse generator 37 (FIG. 1) may be, for example, a free-running multivibrator which produces pulses which are gated by the clock pulse logic circuits 36. The gated pulses CLK are used to count the overshoot count register 14 down to zero and the position count register 16 up or down depending upon whether the sign of the position count register 16 is the opposite or matches the sign of the overshoot count register 14, respectively, that is, when $s=d$ (in Boolean notation) count down of the position count register 16 occurs. During this time the axis incremental transducer system comprising the count generator 26 and the transducer 24 may produce either P pulses or N pulses depending upon the direction of movement in the axis. It can be seen that the P or N pulses must be counted properly as they represent physical displacement of the controlled elements.

Figure 4:
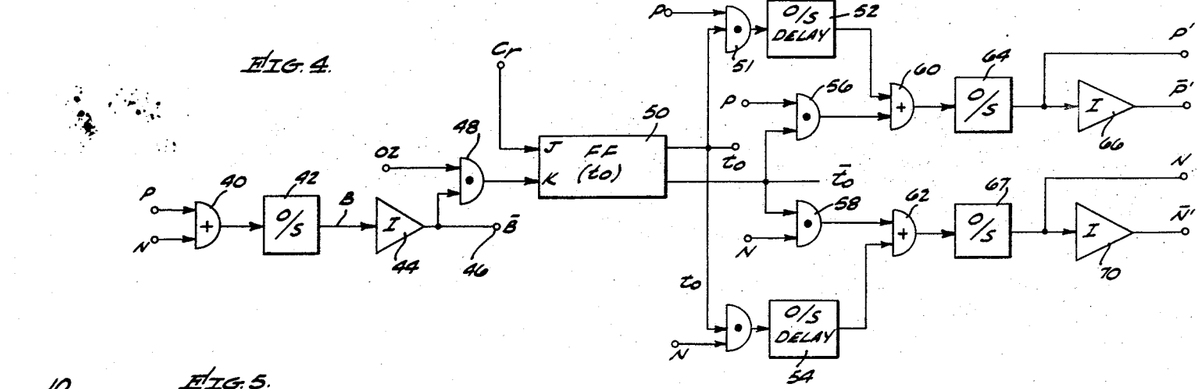
FIG. 4 is a block diagram of an electrical control system which provides delayed count pulses used with the present invention.
Figure 12:
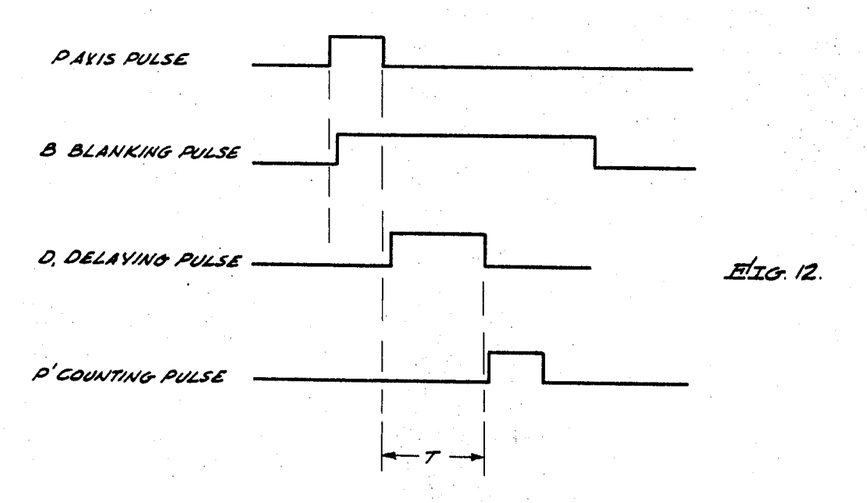
FIG. 12 is a timing signal diagram illustrating selected pulse and control signal relationships.

In order to avoid coincidence of individual pulses P' or N', individually representing an increment of movement in the axis, positive or negative, respectively, with individual clock pulses CLK, a device must be used that warns the circuitry that an axis pulse P' or N' is forthcoming as these pulses occur synchronously with increments of movement in the axis. There is no way of knowing the impending generation of a pulse P' or N'. To solve this problem a time delay is provided which is shown in FIG. 4 and a graphic illustration of these pulses is shown in FIG. 12.

The delayed axis pulse is provided and can be stated in the following equation as stated in Boolean's notations:

$P' = to \cdot P + to \cdot P$ (delayed)
$N' = \overline{to} \cdot N + to \cdot N$ (delayed)
$to (J) = Cr$
$to (K) = OZ \cdot \overline{B}$
$B = P + N$ (delayed)

Where (to) is the set or true output of a transfer overshoot flip-flop 50 (FIG. 4) which enables the transfer of the count of the overshoot register 14 into the position register 16; the count register signal Cr is the true output of the count register flip-flop 74, as shown in FIG. 5 and yet to be explained, which is on during operation of the feed axis drive 22 and movement of in the feed axis 22; and the signal OZ is the output of the zero indicating logic OZ 34 which indicates the count of the overshoot register 14 is at zero.

The above equation is implemented by the circuit shown in FIG. 4 which as P or N pulses coupled as input gating signals to an OR gate 40. The output therefrom is coupled to a one-shot circuit 42 the output signal B of which is coupled as input to an inverter 44, the output signal of which is designated $\overline{B}$ at a terminal 46. The output signal $\overline{B}$ of the inverter 44 is coupled as one enabling input signal to an AND gate 48 which has for its other enabling signal the signal OZ, signal OZ being an indication that the count of the overshoot count register 14 is zero. The output of the AND gate 48 is coupled to the K input terminal of the flip-flop 50 and the J input terminal of the transfer overshoot flip-flop 50 receives the count register signal Cr. The output signals of the transfer overshoot flip-flop 50 are designated to and $\overline{to}$. The signal to is coupled as an enabling signal to an AND gate 51 which when enabled gates a pulse P. The output of AND gate 51 is coupled to a delay one-shot circuit 52. The signal to is also coupled as an enabling input to an AND gate 53 which when enabled gates a signal P and is also coupled as an input signal to a delay one-shot circuit 54. Thus, the pulse P generates a pulse P' immediately in the presence of a signal $\overline{to}$ and delays the generation of a pulse P' in the presence of a signal to. Similar considerations apply to the generation of the pulses N and N'. The signal to by itself, that is, without a pulse P or a pulse N, does not generate a pulse P' or a pulse N'. The signal $\overline{to}$ is coupled as an enabling input to the AND gate 56 which when enabled gates the pulses P. The signal $\overline{to}$ is also coupled as an enabling input to AND gate 58 which when enabled gates the pulses N. The output of the one-shot circuit 52 and the output of AND gate 56 are individually gated by an OR gate 60. Likewise, the output of the one-shot circuit 54 and the output of AND gate 58 are individually gated by an OR gate 62. The output of the OR gate 60 is coupled as an input to a one-shot circuit 64 and the output therefrom provides the pulse P' and may be coupled through an inverter 66. The output from inverter 66 thus provides the pulse $\overline{P}'$. The output of the OR gate 62 is coupled as an input to the one-shot circuit 67 and the output therefrom provides the pulse N' which may be coupled to an inverter 70, the output of inverter 70 thus provides the pulse $\overline{N}'$.

It can be seen that the axis pulse P is delayed by the one-shot circuit 42 and forms the blanking pulse B. The outputs of the OR gates 60 and 62 may provide the feed axis counting pulses from transducer 24 which are delayed and indicated as P' and N'.

The leading edge of the axis pulse P (or N) triggers the one-shot circuit 42 whose output B shall be called the blanking pulse as previously stated. The trailing edge of the axis pulse P (or N) turns on the one-shot circuit 64 (or 67) whose pulse P' (or N') is now accepted by the counting circuitry 18 as the axis pulse which is to be counted.

In this manner, a certain time before a counting pulse P' is applied into the counters a warning signal in the form of the pulse B is generated. The pulse B should be long enough to blank out the counting of a pulse P' including the register ripple time indicated by the letter T in FIG. 12. The duration of pulses P, N, is sufficient to allow switching of the counting gates 18 and 32 and associated circuits, as hereafter explained, from the pulses CLK over to the pulses P' or N' and to allow for completion of counting of the latest pulse CLK that could have passed before the blanking pulse B was generated.

The initial count pulse Cr is provided by a count register flip-flop 74, as shown in FIG. 5. The J and K inputs of the flip-flop 74 are enabled by signals related in the sense expressed by the following equations in Boolean notation:

$Cr (J) = \overline{B} \cdot M$
$Cr (K) = \overline{B} \cdot \overline{M}$ (Eq. 2)

Where $\overline{B}$ is the inverted blanking pulse axis drive and the signal M is the move output signal of a one-shot circuit 82 which prevents the flip-flop 74 from turning off for a certain period of time immediately following the disappearance of a move command when the axis is traveling at a high rate of speed. The move command signals Mp or Mn result from the directional signals d or $\overline{d}$ and the move signal m from a move flip-flop 76. The signals d or $\overline{d}$ from the directional flip-flop 100 indicate the sign of the position register 16. If the flip-flop 100 is true, the signal d exists and the position register 16 will count up in the presence of pulses P', and if the flip-flop 100 is false the signal $\overline{d}$ exists and the position register 16 will count down in the presence of the pulses P'. This will be explained in more detail later in connection with the up/down count logic. The move signal m is the output of the flip-flop 76 which is designated as a move flip-flop which is turned on by a move command emanating from the information input equipment 10 and turned off upon the occurrence of the signal PZ which is produced when the count of the position register 16 reaches zero (provided that the count of the overshoot register 14 has been algebraically combined in the position register 16, at which time the signal OZ exists) and if the transfer overshoot count is completed, at which time signal $\overline{to}$ exists; thus, the flip-flop 76 may be enabled as the following Boolean equation indicates:

$m(J)$ =output from the information input equipment 10
$m(K)=OZ \cdot PZ \cdot \overline{to}$    (Eq. 3)

Where PZ and OZ are the respective outputs of the zero indicating logic circuits 28 and 34 which indicate, respectively, that the count of the position register 16 is at zero and that the count of the overshoot register 14 is zero.

The equations 2 and 3 can be implemented as shown in FIG. 5. In this figure the output from the information input equipment 10 is coupled to the J input of the move flip-flop 76. The AND gate 78 has as its enabling inputs the signals OZ and PZ, indicating that $\overline{to}$, the counts of both the overshoot register and the position register 16 are at zero. The output of AND gate 78 is coupled to the K input of the move flip-flop 76. The true output signal $m$ of the move flip-flop 76 is coupled along with the true signal $d$ as enabling inputs to an AND gate 80; the output of which, via an OR gate 83, may be reshaped by the one-shot circuit 82. The output of one-shot circuit 82 along with a blanking signal $\overline{B}$ are presented as enabling terms to an AND gate 84 and the output therefrom is coupled to the J input terminal of the count register flip-flop 74. The output of the one-shot circuit 82 is inverted by an inverter 85 and presented to the AND gate 84 along with the blanking signal $\overline{B}$. The output of the AND gate 87 is coupled to the K input terminal of the count register flip-flop 74. If the move flip-flop 76 is turned on (signal M at gating level) and the sign of position counter 16 is true or positive, indicated by the signal $d$, an output signal $Mp$ (move positive) will be produced to start the feed axis drive 20 in the positive direction. The resulting pulses P' count down the position count register 16. Note that the position count register 16 is counting down or decreasing in count on the pulses P'.

A signal CLK is generated by the clock logic 36. The following equation defines the clock logic circuit:
$CLK = \overline{B} \cdot \overline{OZ} \cdot to \cdot$ output from clock generator 37    (Eq. 4)

Note that a blanking pulse signal must not be present, as indicated by signal $\overline{B}$, and that the count of the overshoot register 14 is not at zero, as indicated by the signal $\overline{OZ}$, and that transfer of the overshoot count must be taking place, as indicated by the signal $to$, between the overshoot register 14 and the position register 16 before a clock pulse CLK can be generated from pulse generator 86.

Figure 6:
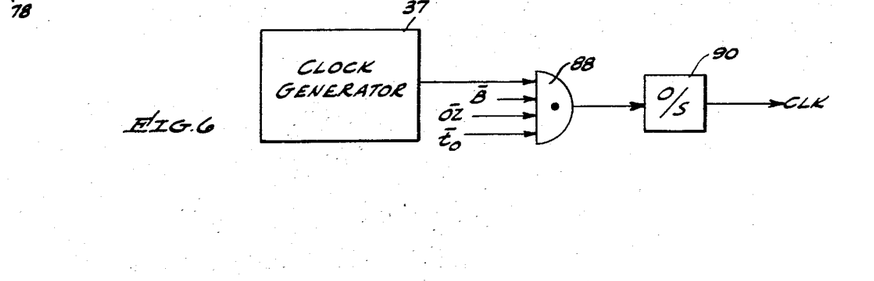
FIG. 6 is a block diagram of that portion of the system which produces clock pulses to be used with this invention.

Circuitry to implement this equation is best shown in FIG. 6 wherein clock pulse generator 37 is coupled to AND gate 88. The signals $\overline{B}$, $\overline{OZ}$ and $(to)$ are the enabling signals applied to AND gate 88. The output of the AND gate 88 is coupled as an input to a one-shot circuit 90 for pulse reshaping purposes and the output of the one-shot circuit 90 thus provides the output clock pulse CLK.

As previously stated the position count register 16 will count down in the presence of a directional sign signal $d$ if a pulse P' is generated by pulse logic circuit 25 and will also count down in the presence of a directional sign signal $\overline{d}$ if a pulse N' is generated by pulse logic 25. The position count register 16 will count up on the directional sign signal $\overline{d}$ if a P' pulse is generated and will also count up on the directional sign signal $d$ if an N' pulse is generated. Thus, the direction in which the position register counts in the presence of the pulse P' or N' depends upon the sign of the register, i.e., signal $d$ or signal $\overline{d}$. When the desired movement in the axis is in the direction arbitrarily chosen as the negative direction, the directional flip-flop 100 is switched to produce the signal $\overline{d}$. When the movement is negative the pulses N' are generated. When movement in the opposite or positive direction is desired the directional flip-flop is switched to produce the signal $d$. When the movement is positive the pulses P' are generated. The directional sign signal $d$, which indicates the sign of the position count register, is generated by a directional flip-flop 100 as shown in FIG. 3, under the control of the reversible count logic 104. Two inputs to the directional flip-flop 100 are coupled from the reversible count logic 104. The directional flip-flop 100 may be controlled from the stored program as in U.S. Pat. No. 3,209,222 referred to above or by a manual switch to indicate the direction of movement and the sign of the position register. The control of the sign flip-flop 102 for the overshoot counter is shown in FIG. 11.

The logic is as follows for the control of the position count register 16:

$$\text{Count up} = Cr \cdot PZ \cdot (N' + P') + Cr \cdot \overline{d} \cdot P' + Cr \cdot d \cdot N'$$
$$+ CLK \cdot PZ + \overline{d} \cdot s \cdot CLK + d \cdot \overline{s} CLK.$$
(Eq. 5)

$$\text{Count down} = Cr \cdot \overline{PZ} \cdot d \cdot P' + Cr \cdot \overline{PZ} \cdot \overline{d} \cdot N'$$
$$+ \overline{PZ} \cdot d \cdot s \cdot CLK + \overline{PZ} \cdot \overline{d} \cdot \overline{s} \cdot CLK$$
(Eq. 6)

Figure 7:
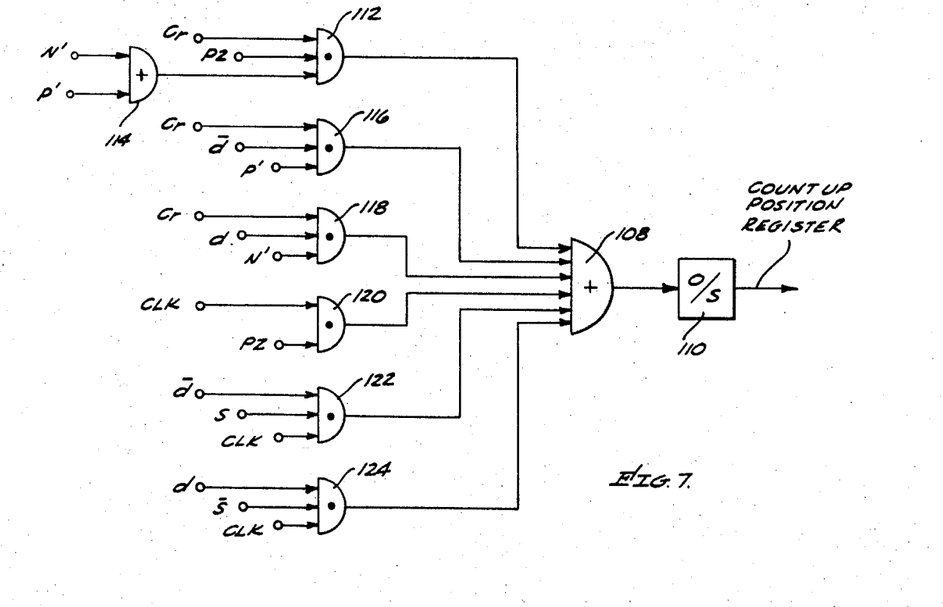
FIG. 7 is a block diagram of a gate network which provides count up signals for the position register.

Implementation of Equation 5 is best shown, by way of example, in FIG. 7. An OR gate 108 receives a plurality of inputs and has an output coupled to a one-shot circuit 110 and the output thereof is coupled to the count up input of the position register 16. One of the inputs of OR gate 108 comes from the output of AND gate 112 which is enabled by the count register signal Cr and the position count register zero signal for gating the pulses P' or N' received from an OR gate 114. This gate 112 causes the register to count up from zero in the presences of pulses P' or N'. OR gate 108 is also enabled by the output of an AND gate 116 which is enabled by the count register signal Cr and the negative direction or sign signal $\overline{d}$ for gating the pulses P'. This gate causes the register to count up in the presence of positive pulses P' when the register sign signal is negative ($\overline{d}$). OR gate 108 is also enabled by an AND gate 118 which is enabled by the count register signal Cr and the positive direction sign signal $d$ for gating negative direction pulses. This gate causes the register to count up in the presence of negative direction pulses N' when the register sign signal is positive ($d$); by an AND gate 120 which is enabled by the position count register zero signal PZ for gating clock pulses CLK; by an AND gate 122 which is enabled by the negative direction sign signal $\overline{d}$ for the position register $\overline{d}$ and the positive overshoot sign signal $s$ for gating clock pulses CLK; and by an AND gate 124 which is enabled by the positive direction sign signal $d$ and the overshoot sign signal $\overline{s}$ for gating clock pulses CLK.

Recalling that in a positioning operation the position count register is operated in a countdown mode, the gates described above cover the conditions under which the register must be counted up. These are summarized as follows:

1. Count up when the count of the position count register is zero in the presence of positive direction pulses P', negative direction pulses N' or clock pulses CLK.

2. Count up when the direction sign signal does not correspond with the direction count pulse.

3. Count up in the presence of clock pulses when the direction sign signal for the position count register is different from the sign signal for the overshoot counter.

Figure 8:
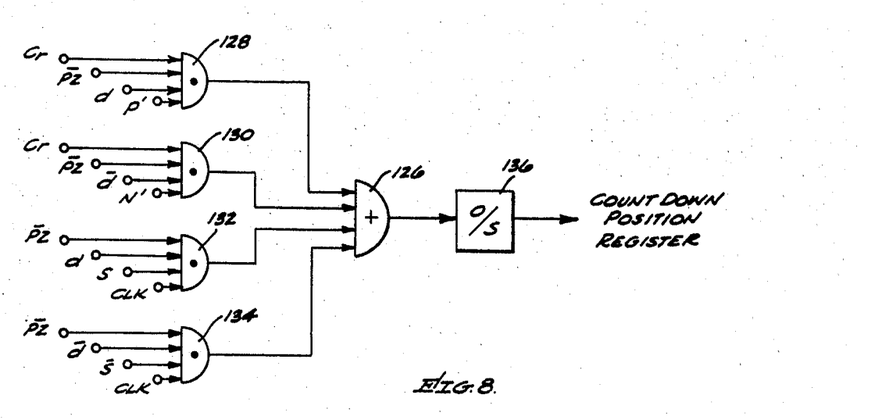
FIG. 8 is a block diagram of a gate network which provides countdown signals for the position register.

The countdown input for the position count register is controlled by the logic circuit as shown in FIG. 8 wherein an OR gate 126 has a plurality of inputs which are individually enabled by the following AND gates:

An AND gate 128 which is enabled by the count register signal Cr, a signal $\overline{PZ}$ which indicates the position count register is not at zero count and the positive direction signal $\overline{d}$ for gating the pulses P'; by an AND gate 130 which is enabled by the signal Cr, the signal $\overline{PZ}$ and the negative direction signal $d$ for gating the negative direction pulses N'; by AND gate 132 which is enabled by the signal PZ, the positive direction sign signal $d$ and the positive sign signal $s$ for gating clock pulses CLK; and by AND gate 134 which is enabled by the signal $\overline{PZ}$ and sign signals $\overline{d}$ and $\overline{s}$ for gating clock pulses CLK. The output of the OR gate 126 is coupled to the input of a one-shot circuit 136 which reshapes the pulse and provides an output therefrom to the countdown input of the count register position 16.

Thus, gates 128 and 130 gate count pulses P' and N', respectively, which count down the position count register when there is movement in the axis, signal $Cr$ when the register is not at a count of zero, signal $\overline{PZ}$, and when the directional sign signal $d$ or $\bar{d}$, indicating the desired direction of movement, is the correct sign signal for the count pulse P' or N' which is being generated. Similarly, gates 132 and 134 gate clock pulses CLK, which count down the register, during the transfer overshoot operation, signal $to$, when the count of the register is not zero, signal $\overline{PZ}$, whenever the sign of the overshoot register is the same as the sign of the position count register.

Count up of the overshoot count register 14 is accomplished in a manner similar to the count up of the position count register 16. The count up and count down of the overshoot count register can be accomplished in the manner defined by the following logical equations:

$$\text{Count up} = \overline{Cr} \cdot OZ \cdot (P' + N') + \overline{Cr} \cdot s \cdot P' + \overline{Cr} \cdot \bar{s} \cdot N' \quad \text{(Eq. 7)}$$

$$\text{Count down} = \overline{Cr} \cdot \overline{OZ} \cdot \bar{s} \cdot P' + \overline{Cr} \cdot \overline{OZ} \cdot s \cdot N' + CLK \quad \text{(Eq. 8)}$$

Figure 9:
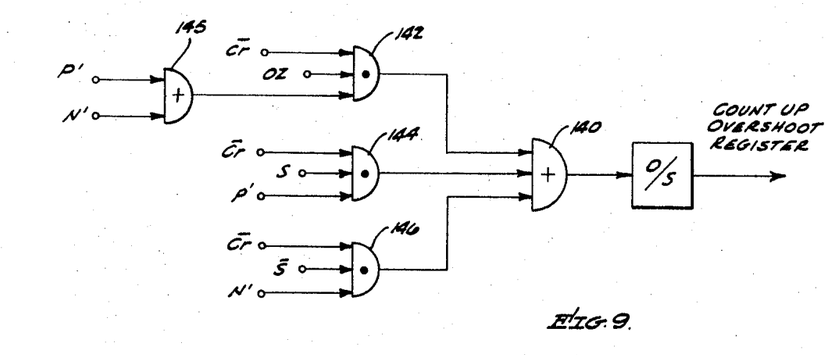
FIG. 9 is a block diagram of a gate network which provides count up signals for the overshoot register.

The above Equation 7 can be implemented by the logic circuitry shown in FIG. 9 which includes an OR gate 140 which receives a plurality of inputs.

Figure 10:
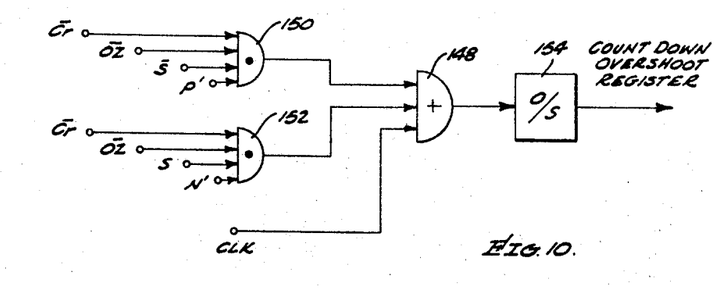
FIG. 10 is a block diagram of a gate network which provides countdown signals for the overshoot register.

OR gate 140 is enabled by the output of AND gate 142 which is enabled by a signal $\overline{Cr}$ which indicates the position count register is not being counted and a signal OZ which indicates the count of the overshoot counter is zero, for gating the count pulses P' or N' from the OR gate 145. OR gate 145 gates either the count pulses P' or the count pulses N'. OR gate 140 is also enabled by an AND gate 144 which is enabled by the signal $\overline{Cr}$, a sign signal $s$ showing the sign of the overshoot counter is positive and a positive direction count pulse P'; and by AND gate 146 which is enabled by the signal $\overline{Cr}$, a signal $\bar{s}$ showing the sign of the overshoot counter is negative, and a negative direction count pulse N'. FIG. 10 illustrates a logical implementation of Equation 8 providing countdown down signals to overshoot count register 14. This logic circuitry comprises an OR gate 148 which gates the clock pulses CLK or the outputs of either of the AND gates 150 or 152. The AND gate 150 is enabled by the signal $\overline{Cr}$, the signal $\overline{OZ}$ which indicates the overshoot counter is not at a count of zero, the negative sign signal $\bar{s}$ and the positive direction count pulses P'. AND gate 152 is enabled by the signal $Cr$, the signal $OZ$, and the positive sign signal $s$ for gating negative direction count pulses N'. The output of OR gate 148 is coupled as an input to a one-shot circuit 154, the output therefrom is coupled to the count down input of the overshoot count register 14.

The logic for enabling the sign flip-flop 102, the output of which indicates the sign of the overshoot count register, may be stated as follows:

S F/F 102 (j)=$\overline{Cr}$  OZ  P'
S F/F 102 (k)=$\overline{Cr}$  OZ  N'

This is best shown in FIG. 11 where the output of the AND gate 160, which gates count pulses P', is coupled to the J input of the sign flip-flop 102 and is enabled by the output of the AND gate 162 which is in turn enabled by a signal $\overline{Cr}$, which indicates the position count register is not being counted, and the signal OZ. Thus, should the count of overshoot register 18 be zero and the count register flip-flop 74 be false, in the presence of a pulse P', the sign flip-flop 102 will be true. The output of the AND gate 164, which gates count pulses N', is coupled to the K input of the sign flip-flop 102 and is enabled by the output of the AND gate 166 which in turn is enabled by the signal $\overline{Cr}$ and the signal OZ, thus setting flip-flop 102 false.

In operation of the present invention, at the start of a movement in the feed axis 22, the desired dimension of that move is stored as a count in the position count register 16 and any accumulated overshoot movement from an immediately preceding movement is stored in the overshoot count register 14. If the position count register logic 18 is turned on by a move command from the electrical control 12, counting into the overshoot register is blocked and counting of the position register 16 is enabled. The turn on of the count register logic 18 is prevented if a blanking pulse B is presented thereto from the blanking pulse logic 27 and as explained in connection with FIG. 4, a B pulse indicates that an axis pulse P or N is in process. If there is time coincidence between a blanking pulse B and a move command signal M from the electrical control 12, the count register logic 18 may or may not change state. In either case, because the origination of the count pulse P' (or N') lags, blanking pulse B by the width of a pulse P (or N), the blanking pulse B is produced by the leading edge of the pulse P and the pulse P' by the trailing edge of the pulse P, the pulses P' (or N') will be counted properly into either the position count register 16 or the overshoot count register 14, particularly in view of the extra delay of the pulse P' (or N') by the one-shot delay circuit 52 (or 54) which further delays the pulse P' (or N').

When the count register flip-flop 74 turns on, it in turn sets true the transfer overshoot flip-flop 50 (FIG. 4). The signal ($to$) is one enabling term on the AND gate 88 (FIG. 6), which with the other signals permits gating of the output of the clock generator 37 to the one-shot circuit 90 for producing pulses CLK which are used during transfer overshoot signal $to$, to count down the overshoot register while algebraically combining the count of the overshoot register with the count of the position count register 16.

In this mode of operation the pulses CLK count down the overshoot count register 14 (the overshoot count register 14 is not accepting any axis generated count pulses P' or N' because the count register flip-flop 74 is true) and the position count register 16 counts up or down as required by comparison of the sign signals produced by the sign flip-flops 100 and 102, respectively.

If a random axis pulse P should appear, a blanking pulse will immediately stop the pulses CLK during the duration of the blanking pulse or signal B. If the blanking pulse or signal B and the clock pulse CLK coincide a clock pulse CLK may or may not be generated. If a clock pulse CLK is allowed to be generated it should be allowed to be counted by position count register 16 before the axis or count pulse P' is generated by pulse logic circuits 25 when an axis or count pulse is presented from count generator 26. To insure this whenever a transfer of the magnitude of the count of the overshoot register is in process and the transfer overshoot flip-flop 50 is on, an additional delay is inserted between the trailing edge of the count pulse P' and the count pulse P by the one-shot circuit 52 wherein when the transfer overshoot flip-flop 50 is set true the trailing edge of the P pulse does not enable or initiate the production of a pulse P' directly through the one-shot circuit 64 but rather triggers the one-shot circuit 52 in series with the one-shot circuit 64, as seen in FIG. 5. In this manner, a clock pulse CLK occurring simultaneously with a count or axis pulse P (so that the blanking pulse or signal B generated by the axis or count pulse P is too late to stop the lock pulse CLK) is allowed to be counted during the duration of the axis or count pulse P plus the duration of the delay signal D to generate and count a register pulse. The extra delay between the pulse P and the pulse P' is removed when transferring is not taking place (flip-flop 50 being turned off) because this extra delay will interfere with high speed counting by adding tolerance and recovery time factors to the generation of the axis or count pulse P'.

When the overshoot register 14 is counted down to zero, the zero count signal OZ is produced and the transfer flip-flop 50 is turned off, preventing further clock pulses CLK from being generated. As the zero count signal OZ may occur at a time when there is an axis or count pulse P' or N' in existence, the turning off of the transfer overshoot flip-flop 50 by the signal OZ is delayed if a blanking pulse or signal B is present from the blanking pulse logic circuits 27. Otherwise, the change of state of the transfer overshoot flip-flop 50 may split an axis or count pulse P' and result in the counting of a pulse P' in both the position count register 16 and the overshoot count register 14. The addition of the blanking pulse or signal B, however, introduces another problem in the possibility of an unwanted clock pulse CLK getting through after the overshoot count register is counted down to zero, signal OZ, and while the transfer overshoot flip-flop 50 waits for the end of the blanking signal B in order to be turned off thereby and thus block further clock pulses CLK. To correct this the signal $\overline{OZ}$ is used as an additional enabling signal on the AND gate 88 which triggers a one-shot circuit 90 as shown in FIG. 6. The movement started by the information input equipment which turns on the move flip-flop 76, as shown in FIG. 5, which turns on the count register flip-flop 74, which turns on the transfer overshoot flip-flop 50 (see FIG. 4), proceeds as the transfer of the overshoot count takes place after which transfer the transfer overshoot flip-flop 50 is turned off by the zero overshoot count signal OZ (see FIG. 4).

Having thus described one embodiment of this invention, what is claimed is:

We claim:

1. In apparatus for electrically controlling the positioning of a moveable element:
   position register means for storing a count indicative of a present desired position of the moveable element;
   means including a movement sensing transducer system for producing pulses for incrementally changing the count of said position register means in response to movement of said moveable element;
   drive means responsive to said position register means for controlling the movement of said moveable element;
   overshoot register means for storing a count indicative of movement of said moveable element to a position beyond a preceding desired position; and
   means for algebraically summing the count of said overshoot register means and said position register means before movement of said moveable element to said present desired position is completed.

2. The apparatus as defined in claim 1 and further comprising:
   means including said drive means for causing the element to move in a positive or negative direction relative to an arbitrary zero position; and
   means for indicating the sign of the desired direction of movement of the moving element.

3. The apparatus as defined in claim 1 wherein said first named means comprises:
   direction pulse generating means having two output circuits, said direction pulse generating means generating a first pulse at one output circuit for each increment of movement of said moveable element in a first direction and a second pulse at the remaining output circuit for each increment of movement of said moveable element in a second direction.

4. The apparatus as defined in claim 3 and further comprising:
   directional sign means for indicating the sign of the desired direction of movement of the moving element; and
   circuit means coupling said directional sign means to said position register means together with either of said first or second pulses to control the direction of counting of said position register.

5. The apparatus as defined in claim 1 and further comprising:
   means for causing said element to move in a positive or negative direction relative to a selected zero position;
   direction sign means for indicating the sign of the desired movement of the moving element; and
   direction pulse generating means having two output circuits, said direction pulse generating means generating a positive direction pulse at one output circuit for each increment of movement of said moveable element in a positive direction and a negative direction pulse at the remaining output terminal for each increment of movement of said moveable element in a negative direction.

6. The apparatus as defined in claim 1 and further comprising:
   clock pulse generating means; and means coupling said clock pulse generating means to said overshoot register means and to said position register means for decreasing the count of said overshoot register means toward its minimum value and correspondingly increasing the count of said position register means.

7. The apparatus as defined in claim 1 and further comprising:
   clock pulse generating means capable of decreasing the count of said overshoot register means toward its minimum value and correspondingly increasing the count of said position register means; and
   gating means coupled to said clock pulse generating means, said gating means being capable of enabling said clock pulse generating means in the absence of movement of said moveable element.

8. The apparatus as defined in claim 1 and further comprising:
   means for causing the moveable element to move in a positive direction or a negative direction relative to a zero position;
   sign indicating means for indicating the sign of said overshoot register;
   sign indicating means for indicating the sign of the desired direction of movement of said moveable element; and
   clock pulse generating means coupled to said overshoot register means and to said position register means for decreasing the count of said overshoot register means towards its minimum value and increasing the count of said position register means correspondingly when the 1 signs of said sign indicating means are different and decreasing the count of said position register means when the signs of said indicating means are the same.

9. The apparatus as defined in claim 8 wherein said clock pulse generating means comprises:
   gating means coupled to said movement sensing transducer system for enabling said clock pulse generating means when there are no pulses from said movement sensing transducer system.

10. In an electrical positioning system for positioning a moveable element:
    drive means for positioning the moveable element;
    transducer means coupled to and controlled by said drive means;
    a numerical control system coupled to said drive means having a bidirectional reversible position counter for receiving a count indicative of a desired position of the moveable element and counted down to zero by said transducer means in response to positioning of said moveable element at said desired position;
    means for moving said moveable element independently of said numerical control system; and
    logic circuit means responsive to said last-named means and coupled to said position counter for enabling said position counter to count in an increasing direction from zero upon movement of said moveable element in either direction from said desired position.

11. The system as defined in claim 10 and further comprising:
    a bidirectional reversible overshoot counter; and
    means coupled to said overshoot counter to set said overshoot counter to a count indicative of excessive movement of said moveable element.

12. The system as defined in claim 10 and further comprising:
    sign storage means for said position counter;
    a bidirectional reversible overshoot counter;

sign storage means for said overshoot counter;

means coupled to said overshoot counter to set said overshoot counter to a count indicative of excessive movements of said moveable element; and means for causing the count of said overshoot counter to be counted into said position counter under the control of both of said sign storage means.

13. The system as defined in claim 10 and further comprising:

sign storage means for said position counter;

a bidirectional reversible overshoot counter;

sign storage means for said overshoot counter;

means coupled to said overshoot counter to set said overshoot counter to a count indicative of excess movements of said moveable element;

counting pulse generating means coupled to said overshoot counter, said counting pulse generating means being capable of counting the count of said overshoot register into said position counter under the control of both of said sign storage means; and blanking pulse generating means coupled to said counting pulse generating means for stopping said counting pulse generating means during periods of movement of said moveable element when said position counter is being counted by said transducer means.

14. The system as defined in claim 13 and further comprising:

logic means coupled to said overshoot counter for causing said overshoot counter to count in an increasing direction from a count of zero.

PO-1050
(5/69)

UNITED STATES PATENT OFFICE
CERTIFICATE OF CORRECTION

Patent No. 3,585,372      Dated June 15, 1971

Inventor(s) Raymond C. Bell, Josef K. Holy, John W. Tarbox and Esteban J. Toscano It is certified that error appears in the above-identified patent and that said Letters Patent are hereby corrected as shown below:

Column 1, line 6, "of", second occurrence, should be --or--;

" 1, " 16, "with" should be --which--;

" 3, " 14, "date" should be --data--;

" 4, " 12, "of" should be --or--;

" 5, " 2, "signal 5" should be --signal s--;

" 5, " 56, "of", first occurrence, should be deleted;

" 5, " 57, after "logic" insert --circuit--;

" 6, " 33, after "whose" insert --output--;

" 7, " 13, after "signals" insert --to,--;

" 7, " 14, after "that" insert --there is no overshoot count to be transferred and that--;

" 8, " 66, "$\bar{d}$" should be --d--;

" 9, " 44, after "countdown" delete "down";

" 10, " 60, "lock" should be --clock--;

" 12, " 37, at the end of the line delete the "1".

Signed and sealed this 4th day of January 1972.

(SEAL)
Attest:

EDWARD M. FLETCHER, JR.
Attesting Officer

ROBERT GOTTSCHALK
Acting Commissioner of Patents